United States Patent [19]
Burger et al.

[11] 3,891,418
[45] June 24, 1975

[54] GAS FILTER

[75] Inventors: Hans Burger; Hans Riester, both of Schaffhausen, Switzerland

[73] Assignee: Georg Fischer Aktiengesellschaft, Switzerland

[22] Filed: Dec. 6, 1973

[21] Appl. No.: 422,290

[30] Foreign Application Priority Data
Dec. 7, 1972 Switzerland.................... 17810/72

[52] U.S. Cl.................... 55/302; 55/293; 55/341; 55/418
[51] Int. Cl............................................ B01d 46/04
[58] Field of Search............ 55/272, 273, 282, 283, 55/293, 301, 302, 303, 304, 341, 468, 96, 450, 413, 414, 418

[56] References Cited
UNITED STATES PATENTS

| | | | |
|---|---|---|---|
| 3,047,208 | 7/1962 | Coanda............................... | 55/468 |
| 3,368,331 | 2/1968 | Baxendale.......................... | 55/341 X |
| 3,429,106 | 2/1969 | Abboud.............................. | 55/293 X |
| 3,509,698 | 5/1970 | Medcalf et al..................... | 55/302 |
| 3,524,304 | 8/1970 | Wittemeier et al................. | 55/341 X |
| 3,606,736 | 9/1971 | Leliaert et al...................... | 55/302 X |
| 3,680,285 | 8/1972 | Wellan et al....................... | 55/302 |
| 3,765,152 | 10/1973 | Pausch................................ | 55/302 X |

*Primary Examiner*—Frank W. Lutter
*Assistant Examiner*—David L. Lacey
*Attorney, Agent, or Firm*—Toren, McGeady and Stanger

[57] ABSTRACT

In a filter for removing dust and the like from a gas, such as air, a filter element is connected at one end to an axially extending outlet sleeve and a guide sleeve is positioned coaxial with and radially inwardly from the outlet sleeve. A flushing gas nozzle is positioned to introduce gas into the outlet sleeve for flow into the filter element. The smallest transverse cross-sectional area of the outlet sleeve is at least equal to the cross-sectional area of the filter element at the location of the connection of the filter element and outlet sleeve. The guide sleeve has a tapered shape in its axial direction and its walls diverge first outwardly from the outlet from the filter element to a transverse plane intermediate its ends and then converge from that plane to its opposite end. The outlet sleeve and guide sleeve have the same transverse cross-sectional shape which may be round, rectangular, or other closed shape. Equally spaced holes are formed in the guide sleeve in its diverging section from the filter element to afford communication between the interior of the guide sleeve and the space between the guide sleeve and the outlet sleeves. The holes can be arranged in one or a number of transverse planes.

20 Claims, 9 Drawing Figures

GAS FILTER

SUMMARY OF THE INVENTION

The present invention is directed to a gas filter and, more particularly, it concerns a gas filter containing one or more filter elements such as filter tubes, filter pockets and filter cells, each equipped with a clean gas outlet and a flushing gas device having at least one flushing gas nozzle arranged for introducing a pressurized back flushing of gas through the filter outlet for cleaning the filter elements.

Gas filters of this type are used particularly as dry filters for cleaning dust-containing gases, particularly dust-laden air. In such gas filters, the gas is supplied to the exterior of the filter elements and after the gas flows through the filter elements it is discharged from the inner side of the element as a clean gas. The impurities removed by the filter surfaces of the filter elements as the gas passes through the element tend to impair the passage of the gas in an undesired manner.

There are known gas filters provided with devices to remove the impurities collected on the filter surfaces. In one of such gas filters, according to German Pat. publication DOS No. 1,757,370, a device is used which includes a clean gas outlet sleeve connected to a filter element with an inserted displacement body and a flushing gas device arranged above the outlet sleeve and cooperating with the diffusor. An annular space is provided between the inner wall of the outlet sleeve and the diffusor through which the entering pressurized flow of gas passes and travels over a part of the inner wall of the filter element.

To achieve optimum flow conditions, certain angles must be maintained on the diffusor so that the flow of the gas does not separate from the walls but contacts the walls as it flows from the outlet sleeve. To meet this condition, the height of the sleeve must be made sufficiently great, related to the filter surface with a given size of filter housing, and such height has an adverse effect on the useful filter area.

Therefore, it is the primary object of the present invention to provide a gas filter with several filter elements with each element having a clean gas outlet sleeve acting as a diffusor and having a compact height characteristic and a maximum efficiency for cleaning the filter elements by means of a pressurized gas surge introduced into the filter elements so that an optimum of useful area can be accommodated in a filter housing of a given size.

In accordance with the present invention, an outlet sleeve is connected to the outlet from a filter element and the smallest flow cross section of the sleeve is equal to or greater than the cross section at the connection of the sleeve to the filter element. Further, a guide sleeve is positioned coaxially with and radially inwardly from the outlet sleeve and divides the flow space through the sleeve into an annular outer cavity and a central inner cavity. The filter element and outlet sleeve are arranged vertically so that the guide sleeve has an upper opening directed toward the flushing gas nozzle of the flushing gas device and it has a lower element at its opposite end directed toward the filter element. The guide sleeve and the outlet sleeve have the same transverse cross-sectional shape and in vertical sections the walls of the guide sleeve are in diverging relationship as they extend upwardly from the filter element to a point intermediate their ends and then they converge to the upper end of the sleeve. Further, openings are provided through the guide sleeve to afford communication between its interior and the space between the guide sleeve and the outlet sleeve. The openings are equally spaced in one or more circumferentially extending rows located below the plane of maximum transverse cross-sectional area of the guide sleeve.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
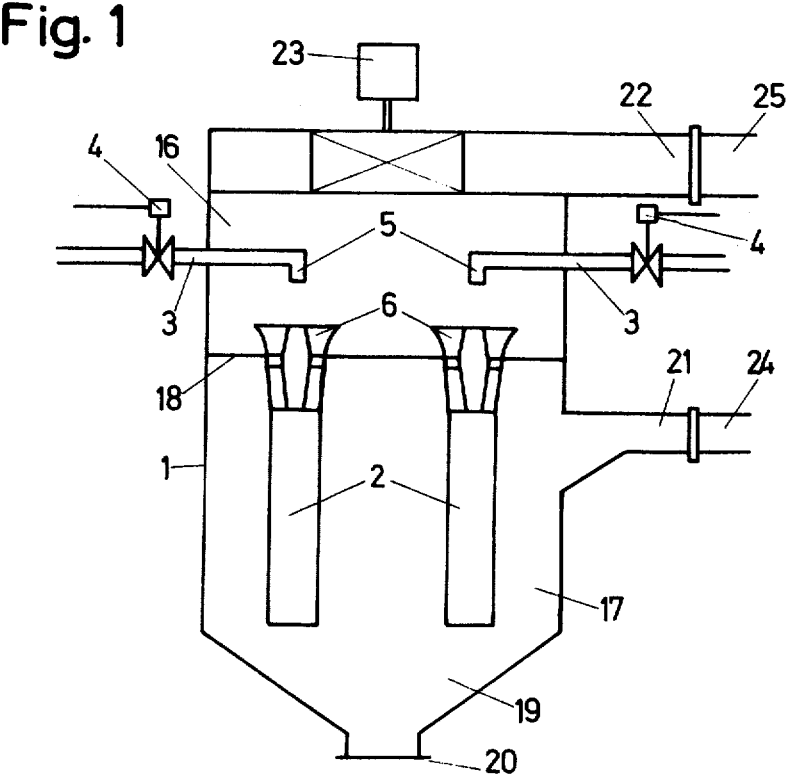
FIG. 1 is a vertical sectional schematic view of a gas filter embodying the present invention.

In FIG. 1 a gas filter is illustrated including a vertically arranged housing 1 divided by a horizontally arranged partition 18 into an upper clean gas chamber 16 and a lower dust-laden gas chamber 17. A connection 21 is provided in the housing 1 in communication with the lower chamber 17 for introducing a supply of dust-laden gas into the chamber. The lower part of the chamber 17 is arranged as a dust collecting space with a dust removal outlet 20. Within the upper part of the clean gas chamber 16 an exhaust device 23 is arranged for withdrawing the clean gas and an outlet opening 22 extends from the chamber and is connected to a clean gas line 25. Further, it is also possible to locate the exhaust device 23 in the clean gas line 25 exteriorly of the gas filter. Detachably mounted in the partition 18 are clean gas outlet members 6 which open into the chamber 16 and each of the outlet members is connected at its lower end to a gas-permeable filter element 2, for example, a filter tube or a filter pocket, by means of a known clamping device, for example, a binding with a snap closure. It is also possible to fix the outlet members to the partitions so they cannot be detached.

Positioned above each outlet member is at least one flushing gas nozzle 5 of a flushing gas device 3. The arrangement and design of the flushing gas nozzles 5 are selected so that the force of the pressurized gas surge supplied through the nozzles for cleaning the filter elements 2 is sufficient to flow effectively through the space 9 within the outlet members 6. A control device 4 is associated with the flushing gas device 3 for regulating the pressurized gas surges through the nozzles 5.

Figure 2:
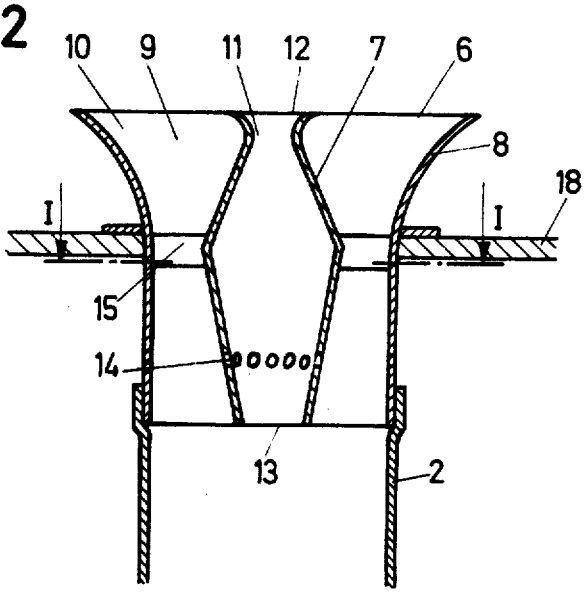
FIG. 2 is an enlarged sectional detail view of a portion of the gas filter shown in FIG. 1.

In FIG. 2 the clean gas outlet member 6 is shown in detail and consists of an outer shell or sleeve 8 which extends upwardly from the outlet end of the filter element 2 and widens at its upper end. As can be seen from FIG. 2, the smallest cross-sectional flow area within the sleeve 8 is at least equal to the cross-sectional flow area at the junction of the sleeve 8 to the filter element 2. In the flow space defined by the sleeve 8 a hollow guide sleeve 7 is coaxially arranged and is detachably connected to the sleeve 8 by means of a number of upwardly extending flat straps 15. The guide sleeve 7 divides the flow space 9 into an annular outer space 10 and a central space 11.

Figure 3:
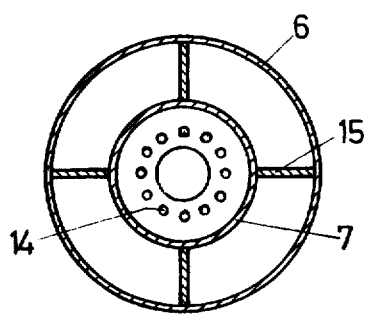
FIG. 3 is a horizontal sectional view taken along the line I—I in FIG. 2.
Figure 4:
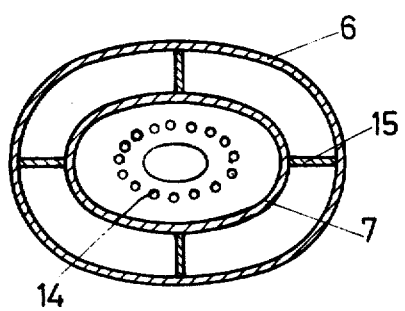
FIGS. 4, 5 and 6 illustrate alternate embodiments of the horizontal sectional arrangement shown in FIG. 3.
Figure 5:
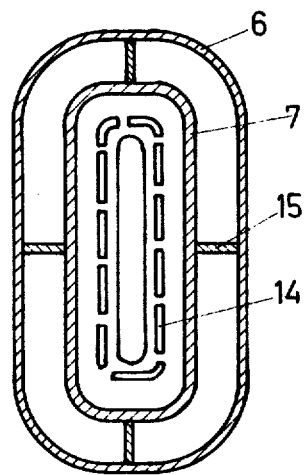
Figure 6:
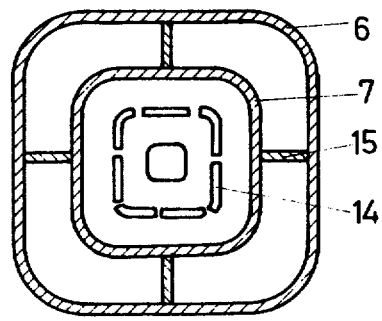
Figure 8:
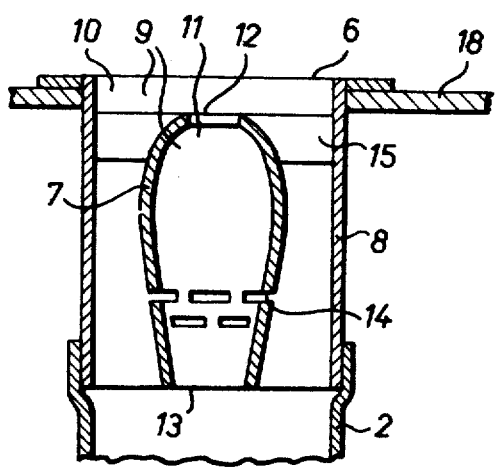
FIGS. 7 and 8 illustrate alternate embodiments of the sectional arrangement shown in FIG. 2.
Figure 7:
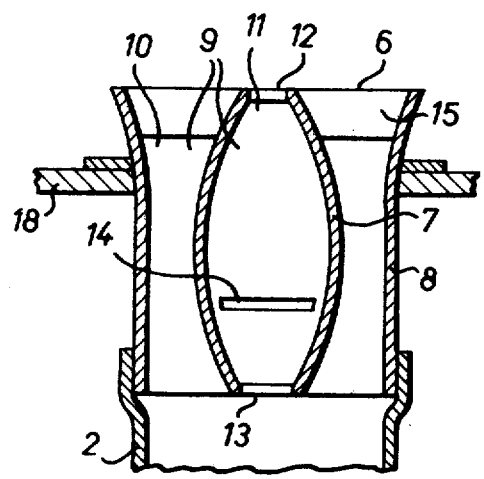

As illustrated in FIGS. 2 and 3, the guide sleeve 7, in its axial or longitudinal direction, has the form of a truncated double cone and is provided with an opening, 12 and 13, at its upper and lower ends. The cross section of the upper opening 12, directed towards the superposed flushing gas nozzle 5, is advantageously smaller than that of the lower opening 13. The truncated cone shape of the sleeve 7 has its maximum transverse cross-sectional area intermediate the openings 12, 13 with the walls of the sleeve diverging from the opening 13 to the plane of the area of maximum transverse cross section and then converging upwardly to the opening 12. However, at the opening 12 the walls of the sleeve are flared outwardly. Instead of a truncated double cone shape, see FIG. 2, the guide sleeve 7 can also be oval-shaped, see FIG. 7, drop-shaped, see FIG. 8, or have the form of a truncated double pyramid, shown also in FIG. 2. The axial length of the guide sleeve 7 is approximately equal to the length of the outlet member 6. In the portion of the walls of the guide sleeve between the plane of maximum transverse cross section and the opening 13, a plurality of openings 14 are provided in a circumferential row, that is, the openings are all in the same plane and are equally spaced apart. Depending on the size and cross-sectional shape of the outlet member 6 and of the guide sleeve 7, the openings 14 can be round, square or slot-shaped, arranged in a plane or different planes. Further, in place of the openings shown in FIGS. 2, 7 and 8, a circumferential slot in an single plane or a circumferential slot arranged in a number of different planes can be utilized.

Depending on the transverse cross-sectional shape of the filter elements to be used, the outlet member 6 and its guide sleeves 7 can be shaped correspondingly and in transverse cross section, that is, horizontal cross section as shown in the drawing, they are coaxially arranged and may be circular, elliptical, rectangular or square, note FIGS. 3, 4, 5 and 6.

Figure 3A:
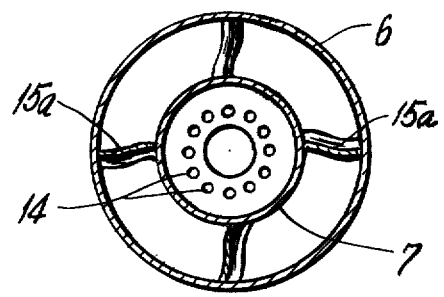
FIG. 3A is a horizontal sectional view similar to FIG. 3 showing another embodiment of the invention.

With the outlet member 6 and its guide sleeve 7 having a circular cross section, the flow of gas therebetween can be given a twist, if the straps 15 are themselves twisted, note twisted straps 15a in FIG. 3A.

In operating the gas filter as described above, the pressurized gas introduced into the filter element is divided in its flow through the outlet member 6 into a partial current passing through the annular space 10 and into another partial current passing through the central space 11. The partial flow through the central space 11 effects, through the openings 14 in the guide sleeve 7, an influence of the boundary layer on the outer wall of the guide sleeve. The pressurized gas flowing in the annular space 10 is drawn against the outside of the guide sleeve 7 due to the openings 14 which tend to equalize the pressure differential between the flow in the annular space 10 and the central space 11. This is so because the narrowing cross-section of the guide sleeve in the vicinity of the openings 14 increases the flow in that area as compared to the flow in the annular area surrounding the guide sleeve 7. Thus an aspiration of the boundary layer surrounding the sleeve 7 is accomplished.

Due to this influence on the boundary layer, a break away of flow on the outer wall of the guide sleeve 7 is avoided and with the selected compact height of the clean gas outlet member 6 the formation of interference zones in the transition space from the filter element is prevented. That is to say, a flow is achieved that is turbulent-free.

Due to this arrangement, there is the advantage that the height of the outlet member can be reduced as compared to known filters since the aperture angle between the shell or sleeve 8 and the guide sleeve 7 can be increased in the direction of the filter member, so that it is possible to provide a larger useful filter area in a housing of a given size.

We claim:

1. A gas filter with at least one filter element having an outlet, a clean gas outlet sleeve connected to said outlet of said filter element extending axially of said filter element, a flushing gas device with at least one flushing gas nozzle arranged above said outlet sleeve to introduce a pressurized back flushing gas surge through said outlet sleeve into said outlet of said filter element for cleaning it, wherein the improvement comprises that the smallest cross section of said sleeve transversely of its axis is at least equal to the flow cross section at the connection of said sleeve to said filter element, a hollow guide sleeve positioned within and extending in the axial direction of said outlet sleeve, said guide sleeve spaced radially inwardly from said outlet sleeve and dividing the interior of said outlet sleeve into an annular outer space and a central inner space, said guide sleeve having a first opening at one end directed toward said filter element and a second opening at its opposite end directed toward said flushing gas nozzle, said guide sleeve having a cross-sectional shape normal to its axis corresponding to the cross-sectional shape of said filter element, the transverse cross section of said guide sleeve varying between said first and second openings, and said guide sleeve having at least one other opening therethrough intermediate its ends and affording communication between the inner space and the annular outer space within said outlet sleeve.

2. A gas filter, as set forth in claim 1, wherein said guide sleeve has an axial length substantially equal to the axial length of said outlet sleeve.

3. A gas filter, as set forth in claim 1, wherein said outlet sleeve and guide sleeve are coaxially arranged and are circular in cross section transverse to their common central axis.

4. A gas filter, as set forth in claim 1, wherein said outlet sleeve and guide sleeve are coaxially arranged and are elliptical in cross section transverse to their common central axis.

5. A gas filter, as set forth in claim 1, wherein said outlet sleeve and guide sleeve are coaxially arranged and are rectangular in cross section transverse to their common central axis.

6. A gas filter, as set forth in claim 1, wherein said outlet sleeve and guide sleeve are coaxially arranged and are square in cross section transverse to their common central axis.

7. A gas filter, as set forth in claim 1, wherein said guide sleeve has the form of a truncated double cone with the maximum transverse cross-sectional area of said double cone located in a plane intermediate the first and second openings of said guide sleeve and said double cone tapering inwardly from the plane of maximum transverse cross section to the first and second openings in said guide sleeve.

8. A gas filter, as set forth in claim 1, wherein said guide sleeve is oval-shaped in axial section.

9. A gas filter, as set forth in claim 1, wherein said guide sleeve is drop-shaped in axial section.

10. A gas filter, as set forth in claim 1, wherein said guide sleeve is in the shape of a truncated double pyramid in axial section.

11. A gas filter, as set forth in claim 1, wherein said guide sleeve is detachably connected to said outlet sleeve.

12. A gas filter, as set forth in claim 1, wherein the end of said outlet sleeve spaced upwardly from said filter element is curved outwardly.

13. A gas filter, as set forth in claim 1, wherein the cross section of said first opening is larger than that of said second opening.

14. A gas filter, as set forth in claim 1, comprising a plurality of filter elements and outlet sleeves arranged to form a plurality of filter elements-outlet sleeve combinations, a vertically arranged housing laterally enclosing said filter elements and outlet sleeves, an outwardly arranged partition extending transversely within said housing and intersecting said filter element outlet sleeve combinations intermediate therein, said partition dividing the space within said housing into a lower dust gas space and an upper clean gas space, said flushing gas device located above the upper ends of each of said outlet sleeve combinations within the clean gas space, and means for withdrawing clean gas from the clean gas space.

15. A gas filter, as set forth in claim 1, wherein said guide sleeve has a maximum cross-sectional area transverse to its axial direction in a plane intermediate its first and second openings and said at least one other opening therethrough is located between the plane of the maximum transverse cross-sectional area and said first opening.

16. A gas filter, as set forth in claim 15, wherein said at least one other opening through said guide sleeve comprises a number of equally spaced openings located in the same plane extending transversely of the axis of said guide sleeve.

17. A gas filter, as set forth in claim 15, wherein said at least one other opening through said guide sleeve comprises a number of equally spaced openings in a number of planes extending transversely of the axis of said guide sleeve.

18. A gas filter, as set forth in claim 15, wherein said at least one other opening through said guide sleeve comprises at least one circumferentially extending slot.

19. A gas filter, as set forth in claim 1, wherein a number of angularly spaced flat straps are connected to and extend between said outlet sleeve and said guide sleeve for supporting the guide sleeve from said outlet sleeve, as well as extending at least partially in the axial direction of said outlet sleeve.

20. A gas filter, as set forth in claim 19, wherein said flat straps are twisted about their axes for imparting a twist to the gas flow passing through said annular outer space.

* * * * *